US012617442B2

(12) United States Patent
Zhu

(10) Patent No.: US 12,617,442 B2
(45) Date of Patent: May 5, 2026

(54) COLLAPSIBLE WAGON WITH FOLDABLE HANDLE AND BASKET EXTENSION

(71) Applicant: MAXTON ENGINEERING LTD., Central (HK)

(72) Inventor: Shou Qiang Zhu, La Verne, CA (US)

(73) Assignee: MAXTON ENGINEERING LTD., Central (HK)

( * ) Notice: Subject to any disclaimer, the term of this patent is extended or adjusted under 35 U.S.C. 154(b) by 310 days.

(21) Appl. No.: 18/337,351

(22) Filed: Jun. 19, 2023

(65) Prior Publication Data
US 2024/0067246 A1 Feb. 29, 2024

Related U.S. Application Data

(60) Provisional application No. 63/355,003, filed on Jun. 23, 2022.

(51) Int. Cl.
*B62B 3/00* (2006.01)
*B62B 3/02* (2006.01)
*B62B 5/06* (2006.01)

(52) U.S. Cl.
CPC .............. *B62B 3/007* (2013.01); *B62B 3/022* (2013.01); *B62B 5/061* (2013.01); *B62B 2205/06* (2013.01)

(58) Field of Classification Search
CPC ......... B62B 3/007; B62B 3/025; B62B 3/027; B62B 3/1464; B62B 3/1468; B62B 2205/06; B62B 2205/30; B62B 5/067
See application file for complete search history.

(56) References Cited

U.S. PATENT DOCUMENTS 3,799,567 A * 3/1974 Toda .......................... B62B 9/26
280/644
6,540,239 B2 * 4/2003 Lee, Jr. ................... B62B 3/008
280/33.993
8,011,686 B2 * 9/2011 Chen ....................... B62B 3/106
280/87.01

(Continued)

FOREIGN PATENT DOCUMENTS

DE 202020102798 U1 * 5/2020 ........... B62B 5/0461

OTHER PUBLICATIONS

"MacSports Push Pull Wagon Denim Blue"; Feb. 16, 2021; https://www.amazon.com/Collapsible-Portable-Lightweight-Adjustable-Landscape/dp/B08WRVMC1S?th=1 (Year: 2021).*

*Primary Examiner* — Emma K Frick
(74) *Attorney, Agent, or Firm* — LIU & LIU

(57) ABSTRACT

A collapsible utility wagon includes a push-back function device assembly, and a collapsible utility wagon body assembly, wherein the push-back function device assembly is provided behind the collapsible utility wagon body assembly. The push-back function device assembly includes a rear wheel frame assembly, a front handlebar strut assembly, two rear handlebar strut assemblies, a lock device assembly, a handlebar assembly, a lock hook, a lock column, a mesh bag and rear wheels. The push-back function device assembly is provided behind the collapsible utility wagon body assembly, so that a sheet-like collapsible wagon is enabled to implement a push-back function instead of being able to be pulled only forward as that of the prior art. The collapsible utility wagon has a good link ability, and can be unfolded or collapsed with a simple process and a minimal effort with ease of use.

15 Claims, 11 Drawing Sheets

(56)                    References Cited

U.S. PATENT DOCUMENTS

|  |  |  |  |  |
|---|---|---|---|---|
| 9,145,154 B1* | 9/2015 | Horowitz | .............. | B62B 5/0013 |
| 9,855,962 B1* | 1/2018 | Chen | ....................... | B62B 3/025 |
| 10,272,937 B2* | 4/2019 | Chen | .................... | B62B 5/0003 |
| 10,562,556 B1* | 2/2020 | Horowitz | ............... | B62B 5/064 |
| 10,988,153 B1* | 4/2021 | Horowitz | ............... | B62B 7/008 |
| 2023/0322284 A1* | 10/2023 | Zhu | ........................ | B62B 3/007 |
|  |  |  |  | 280/651 |

* cited by examiner

COLLAPSIBLE WAGON WITH FOLDABLE HANDLE AND BASKET EXTENSION

BACKGROUND OF THE INVENTION

Field of the Invention

The present invention relates to the field of outdoor leisure furniture, and more particularly to a collapsible utility wagon with push-back function device.

Description of the Prior Art

Collapsible wagons are frequently used in when passing time outdoors or at the beach. There are two types of collapsible wagons in the prior art. One is a collapsible wagon that can be pulled only forward, and the other is a collapsible wagon that has a simple push-back function. The operations of the above are complicated, and both hands are needed to in order to unfold or collapse such collapsible wagons. Moreover, a gap between a handle and a wagon body is rather large, rendering poor stability.

SUMMARY OF THE INVENTION

It is an object of the present invention to provide a collapsible utility wagon with a push-back function device having a simple structure, a reasonable design and ease of use to improve the drawbacks and issue of the prior art. The collapsible utility wagon of the present invention can be operated single-handedly and be collapsed with a simple operation and a minimal effort. Moreover, the collapsible utility wagon of the present invention occupies a small space when collapsed and thus can be readily placed in a back trunk of a vehicle when located outdoors or be easily erected within a small space when located indoors, and has a light weight and a good stability.

To achieve the above object, a collapsible utility wagon with a back-push function device provided by a technical solution of the present invention includes a push-back function device assembly, and a collapsible utility wagon body assembly, wherein the push-back function device assembly is provided behind the collapsible utility wagon body assembly.

The push-back function device assembly includes a rear wheel frame assembly, a front handlebar strut assembly, two rear handlebar strut assemblies, a lock device assembly, a handlebar assembly, a lock hook, a lock column, a mesh bag and rear wheels. The lock device assembly is disposed on a top portion of the rear wheel frame assembly. The front handlebar strut assembly has a lower end rotatably connected to the rear wheel frame assembly, and an upper end rotatably connected to a front end of the handlebar assembly. The two rear handlebar strut assemblies are left-right symmetrically arranged on two sides of the rear wheel frame assembly. Each of the rear handlebar strut assemblies has one end rotatably connected to a middle portion of the rear wheel frame assembly and the other end rotatably connected to a rear end of the handlebar assembly. The lock hook is disposed at a connection point of the right rear handlebar strut assembly and the handlebar assembly. The mesh bag has four corners fixed on an inner side of the handlebar assembly. The two rear wheels are left-right symmetrically arranged on a bottom portion of the rear wheel frame assembly. The lock column is disposed on a right lower end of the rear wheel frame assembly.

Further, the collapsible utility wagon body assembly includes a fabric wagon body. The fabric wagon body has a front side provided with front wheels, and has left and right sides symmetrically arranged with cross-bar assemblies. Each of the cross-bar assemblies is formed by connecting multiple cross-bars. The rearmost upper cross-bar is provided with a pull plate. The collapsible utility wagon body assembly is rotatably connected to the middle portion and the lower end of the two sides of the rear wheel frame assembly through the rearmost lower cross-bar and the pull plate.

Further, the rear wheel frame assembly includes a wheel frame, a rear wheel frame support, lock seat securing rods, rear axle supports, and handlebar strut connecting members. The rear wheel frame support is disposed at a bottom portion of the rear wheel frame. The two rear axle supports are left-right symmetrically arranged at a bottom portion of the rear wheel support. The two lock seat securing rods are left-right symmetrically arranged on an upper inner side of the rear wheel frame. The two handlebar strut connecting members are left-right symmetrically arranged on a top portion of the rear wheel frame.

Further, the front handlebar strut assembly includes front handlebar struts and a handlebar locking rod. The two front handlebar struts are left-right symmetrically arranged on two ends of the handle lock rod, and have both upper and lower ends provided with sleeves.

Further, the rear handlebar strut assembly includes rear handlebar struts and sleeves. The rear handlebar struts have both upper and lower ends provided with the sleeves.

Further, the handlebar assembly includes a handlebar, a handlebar rubber cover and top covers. The handlebar cover sleeves a middle portion of the handlebar, and the handlebar has both ends provided with the top covers.

Further, the mesh bag has four corners provided with assembly holes, and the four corners of the mesh bag are fixed to an inner side of the handlebar assembly through the assembly holes.

Further, the lock device assembly includes an unlock rod assembly and two lock assemblies symmetrically arranged on two ends of the unlock rod assembly. The unlock rod assembly includes an unlock rod, blind rivet nuts, and an unlock rod rubber cover. The two blind rivet nuts are left-right symmetrically arranged on two ends of the unlock rod. The unlock rod rubber cover is disposed on a middle portion of the unlock rod. The lock assembly includes a lock seat, a locking member, a lock slide block, a lock seat top cover, a lock seat rear cover, a locking member spring and a slide block spring.

Compared to the prior art, the collapsible utility wagon with a push-back function device of the prevent invention employing the structure above provides the following advantages.

1. The push-back function device assembly can be additionally installed to the rear of an integral collapsible utility wagon to additionally provide a collapsible wagon that could only be pulled forward with a push-back function.

2. The collapsible utility wagon with a push-back function device of the prevent invention has a good linking ability, and can be unfolded or collapsed with a simple process and a minimal effort with ease of use.

3. The collapsible utility wagon with a push-back function device of the prevent invention has a small volume when collapsed, can be readily placed in a back trunk of a vehicle when located outdoors or be easily erected within a small space indoors, and has a light weight and a good stability.

4. The collapsible utility wagon with a push-back function device of the prevent invention provides features including a simple structure, a reasonable configuration and low manufacturing costs.

BRIEF DESCRIPTION OF THE DRAWINGS

To more clearly describe the technical solutions of the embodiments of the present invention and the prior art, accompanying drawings that need to be used as required in the embodiments are to be briefly introduced. It is obvious that the accompanying drawings below are merely some embodiments of the present invention, and other accompanying drawings can be obtained on the basis of the these accompanying drawings by a person of ordinary skill in the art without involving any inventive skill.

BRIEF DESCRIPTION OF NUMERALS OF THE DRAWINGS

Figure 1:
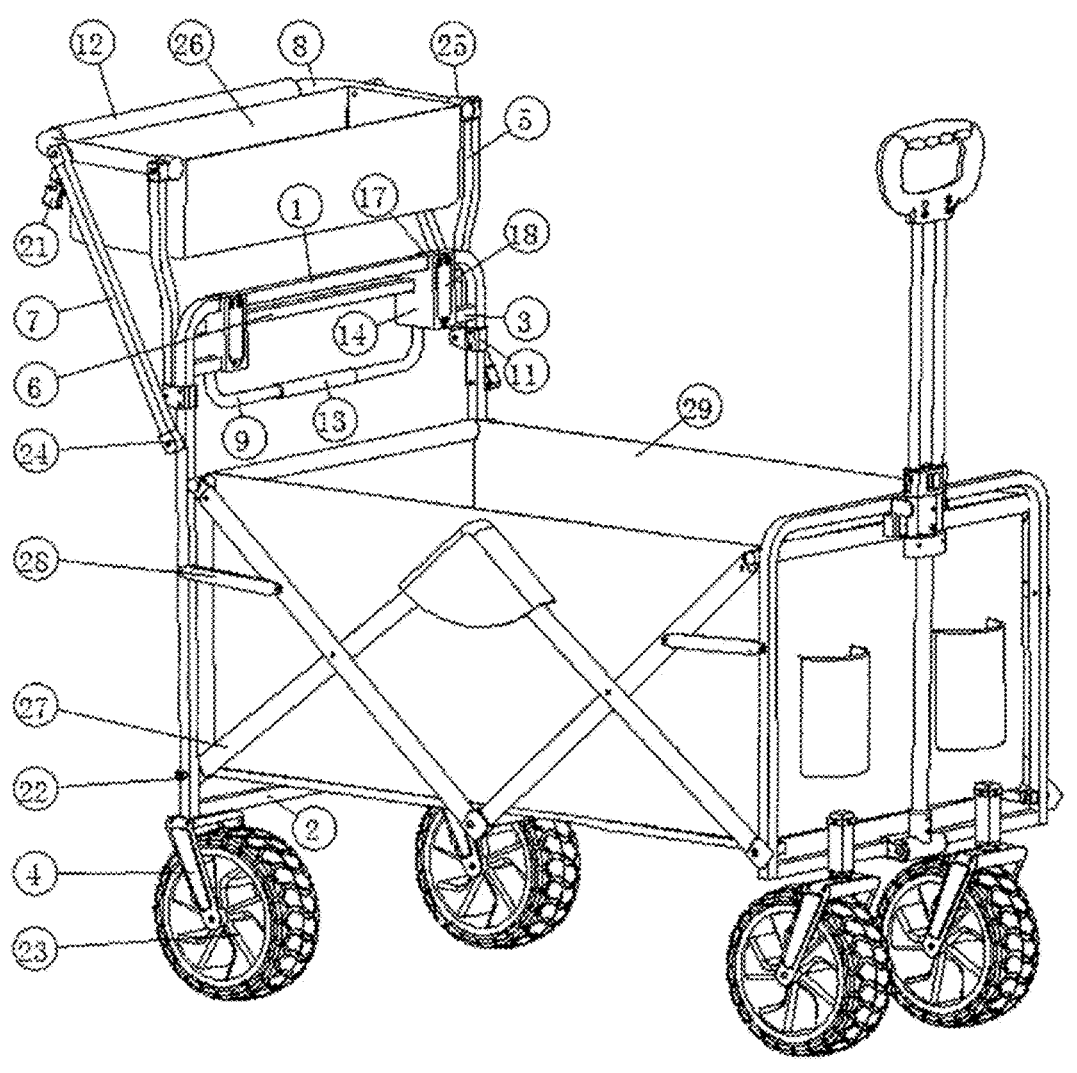
FIG. 1 is a schematic diagram of an unfolded state of the present invention.

1 Rear wheel frame
2 Rear wheel frame support
3 Lock seat securing rod
4 Rear axle support
5 Front handlebar strut
6 Handlebar locking rod
7 Handlebar support strut
8 Handlebar
9 Unlock rod
10 Blind rivet nut
11 Handlebar strut connecting member
12 Handlebar rubber cover
13 Unlock rod rubber cover
14 Lock seat
15 Lock slide block
16 Locking member
17 Lock seat top cover
18 Lock seat rear cover
19 Lock slide block spring
20 Locking member spring
21 Lock hook

4

22 Lock column
23 Rear wheel
24 Sleeve
25 Top cover
26 Mesh bag
27 Cross-bar
28 Pull plate
29 Fabric wagon body

DETAILED DESCRIPTION OF THE EMBODIMENTS

The present invention is further described with the accompanying drawings below.

Figure 2:
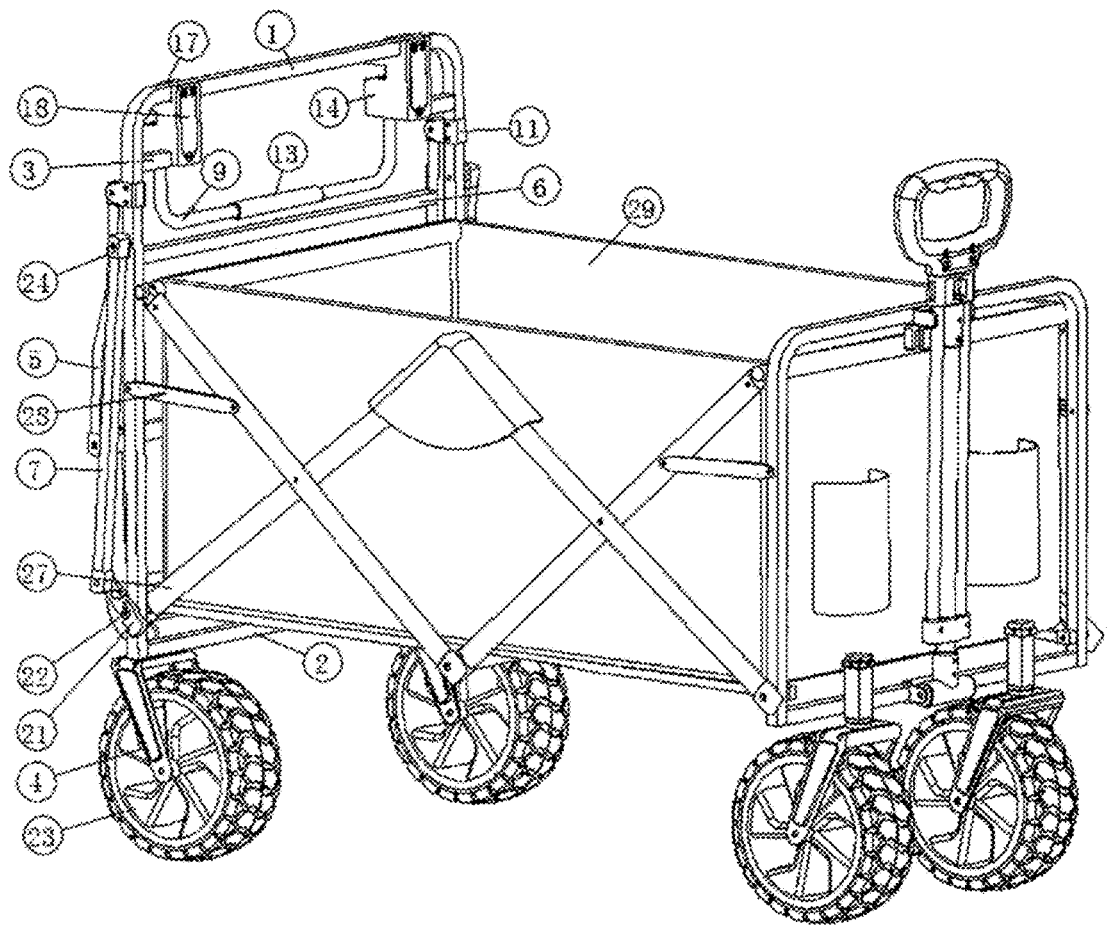
FIG. 2 is a schematic diagram of a collapsed state of the present invention.
Figure 4:
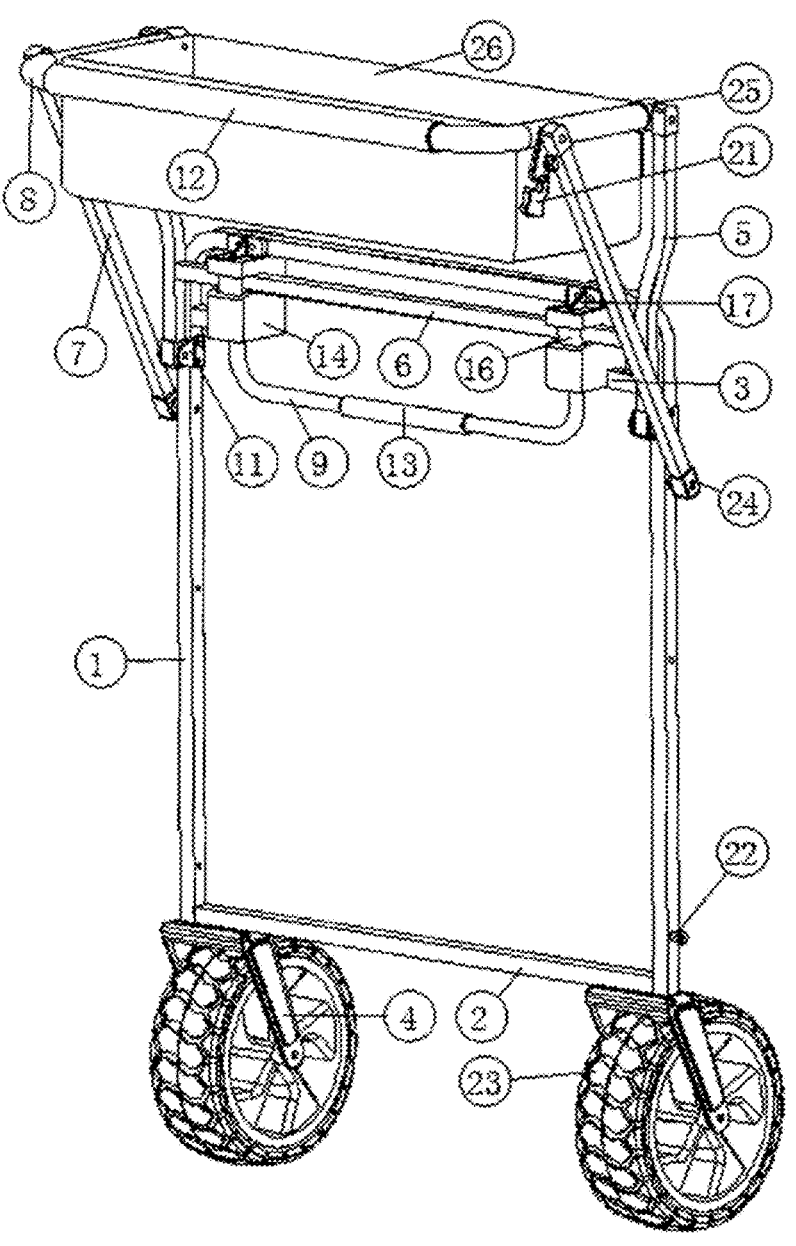
FIG. 4 is a schematic diagram of a structure of a push-back function device assembly.

Referring to FIG. 1, FIG. 2 and FIG. 4, a technical solution provided by the present invention is as follows, that is, including a push-back function device assembly, a collapsible utility wagon body assembly, wherein the push-back function device assembly is provided behind the collapsible utility wagon body assembly. The push-back function device assembly includes a rear wheel frame assembly, a front handlebar strut assembly, two rear handlebar strut assemblies, a lock device assembly, a handlebar assembly, a lock hook 21, a lock column 22, a mesh bag 26 and rear wheels 23. The lock device assembly is disposed on a top portion of the rear wheel frame assembly. The front handlebar strut assembly has a lower end rotatably connected to the rear wheel frame assembly, and an upper end rotatably connected to a front end of the handlebar assembly. The two rear handlebar strut assemblies are left-right symmetrically arranged on two sides of the rear wheel frame assembly. Each of the rear handlebar strut assemblies has one end rotatably connected to a middle portion of the rear wheel frame assembly and the other end rotatably connected to a rear end of the handlebar assembly. The lock hook 21 is disposed at a connection point of the right rear handlebar strut assembly and the handlebar assembly. The mesh bag 26 has four corners fixed on an inner side of the handlebar assembly. The two rear wheels 23 are left-right symmetrically arranged on a bottom portion of the rear wheel frame assembly. The lock column 22 is disposed on a right lower end of the rear wheel frame assembly.

Figure 3:
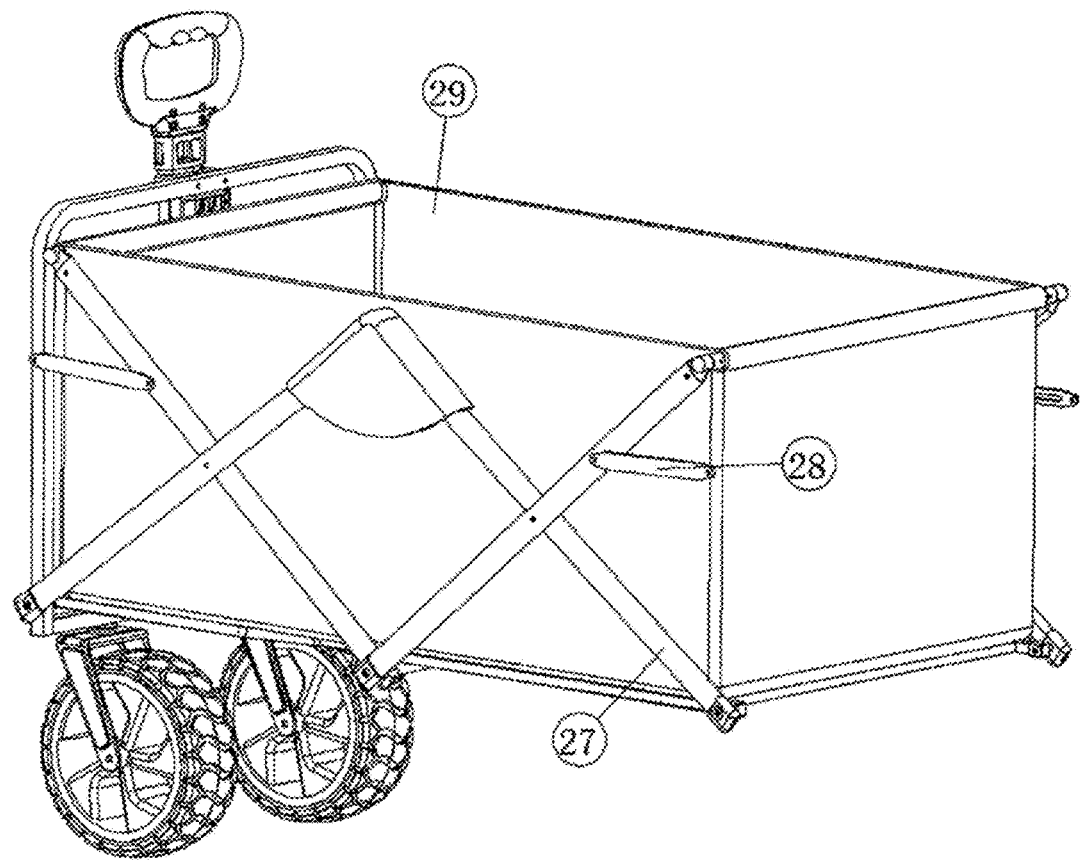
FIG. 3 is a schematic diagram of a structure of a collapsible utility wagon body assembly.

Referring to FIG. 3, the collapsible utility wagon body assembly includes a fabric wagon body 29. The fabric wagon body 29 has a front side provided with front wheels, and has left and right sides symmetrically arranged with cross-bar assemblies. Each of the cross-bar assemblies is formed by rotatably connecting multiple cross-bars 27. The rearmost upper cross-bar 27 is provided with a pull plate 28. The collapsible utility wagon body assembly is rotatably connected to the middle portion and the lower end of the two sides of the rear wheel frame assembly through the rearmost lower cross-bar 27 and the pull plate 28.

Figure 5:
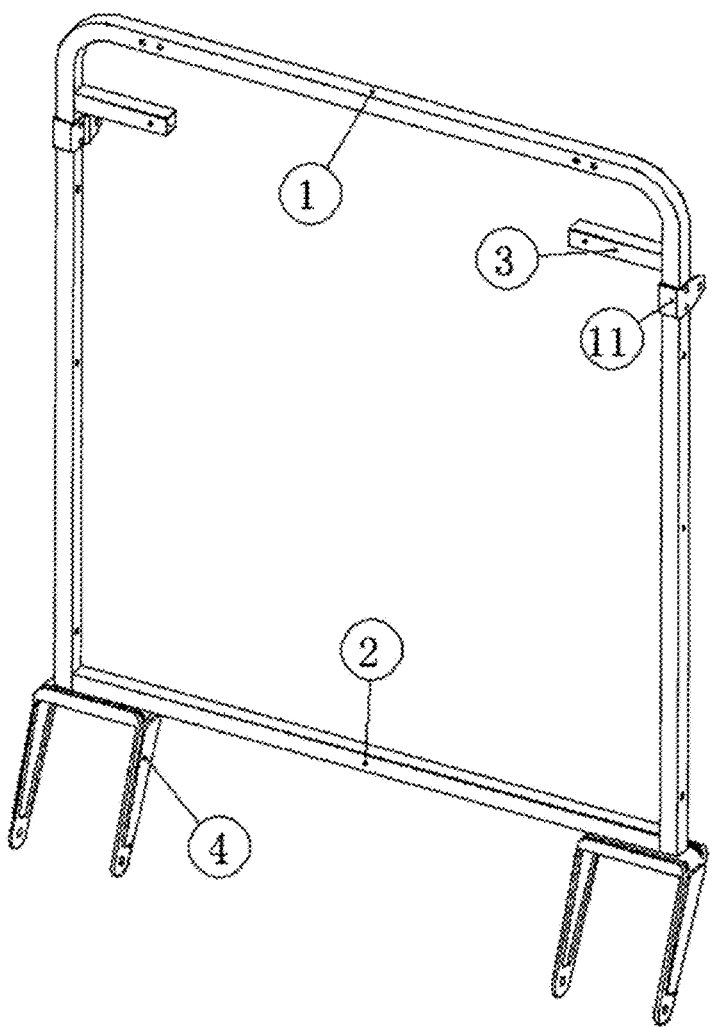
FIG. 5 is a schematic diagram of a structure of a rear wheel frame.

Referring to FIG. 5, the rear wheel frame assembly includes a rear wheel frame 1, a rear wheel frame support 2, lock seat securing rods 3, rear axle supports 4, and handlebar support connecting members 11. The rear wheel frame support 2 is welded to a bottom portion of the rear wheel frame 1. The two rear axle supports 4 are left-right symmetrically arranged on the rear wheel support 2 and welded. The two lock seat securing rods 3 are left-right symmetrically arranged on an upper inner side of the rear wheel frame 3 and welded. The two handlebar strut connecting members 11 are left-right symmetrically arranged on a top portion of the rear wheel frame 1.

Figure 6:
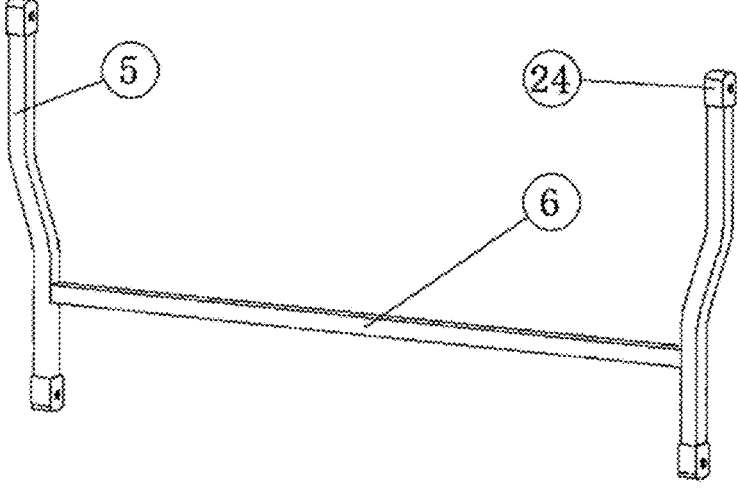
FIG. 6 is a schematic diagram of a structure of a front handlebar strut assembly.

Referring to FIG. 6, the front handlebar strut assembly includes front handlebar struts 5, a handlebar locking rod 6 and sleeves 24. The two front handlebar struts 5 are left-right symmetrically arranged on two ends of the handle lock rod 6 and welded, and have both upper and lower ends provided with the sleeves 24.

Figure 7:
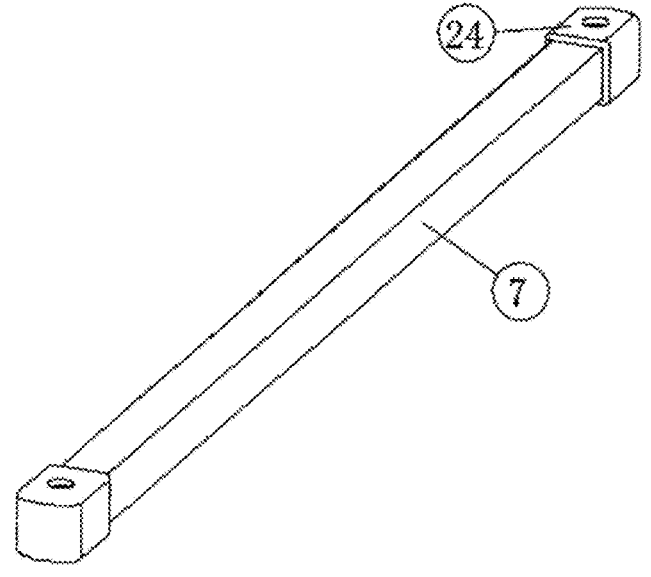
FIG. 7 is a schematic diagram of a structure of a rear handlebar strut assembly.

Referring to FIG. 7, the rear handlebar strut assembly includes rear handlebar struts 7 and the sleeves 24. The rear handlebar struts 7 have both upper and lower ends provided with the sleeves 24.

Figure 8:
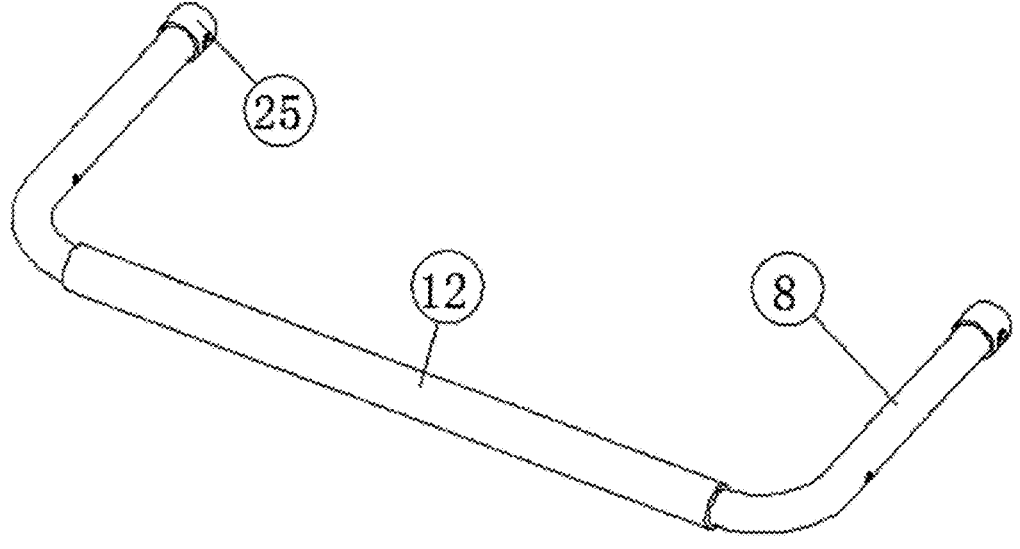
FIG. 8 is a schematic diagram of a structure of a handlebar assembly.

As shown in FIG. 8, the handlebar assembly includes a handlebar 8, a handlebar rubber cover 12 and top covers 25. The handlebar cover sleeves a middle portion of the handlebar 8, and the handlebar 8 has both ends provided with the top covers 25.

Figure 9:
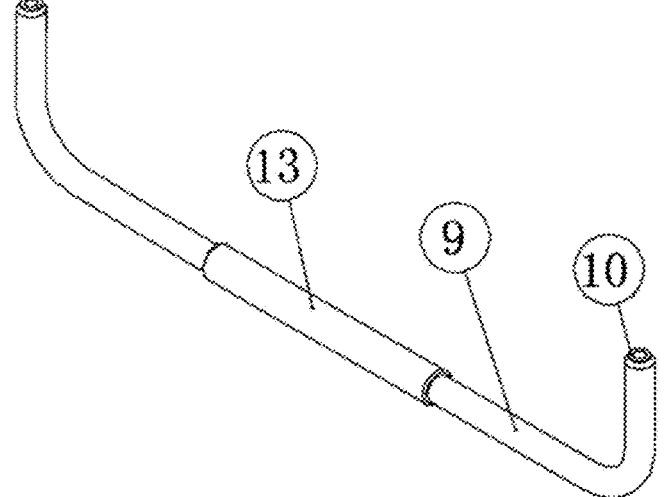
FIG. 9 is a schematic diagram of a structure of an unlock rod assembly.
Figure 10:
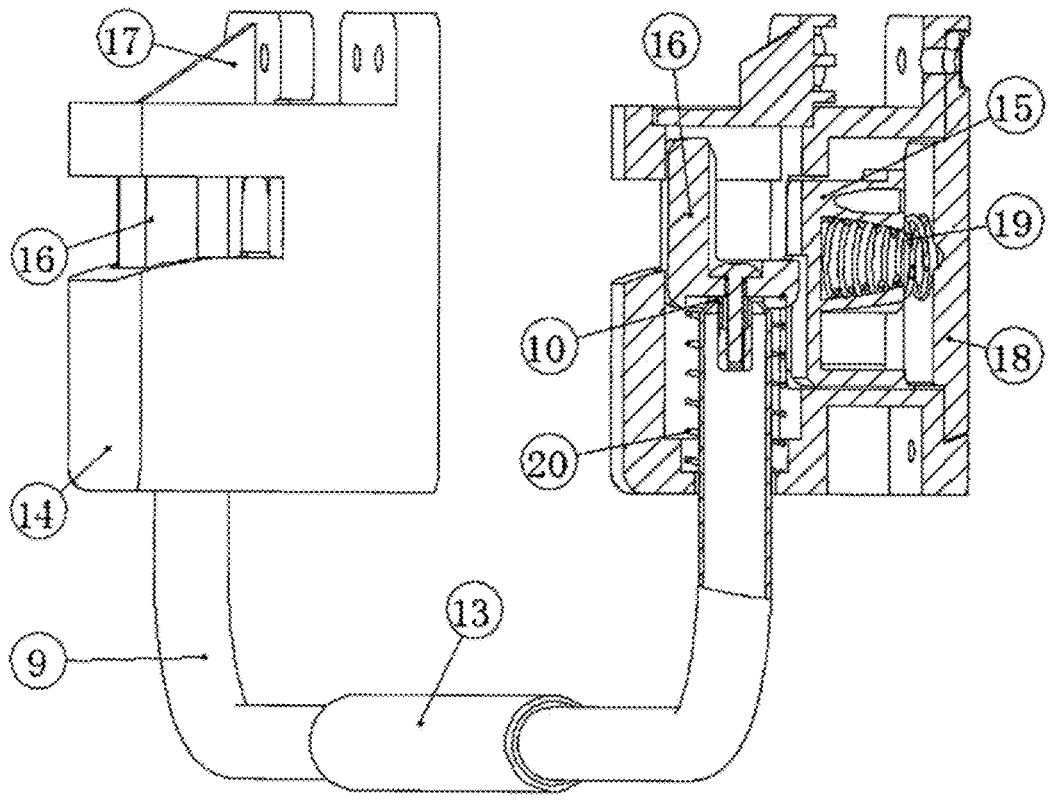
FIG. 10 is a schematic diagram of a locked state of a lock device assembly.

Referring to FIG. 9 and FIG. 10, the lock device assembly includes an unlock rod assembly and two lock assemblies symmetrically arranged on two ends of the unlock rod assembly. The unlock rod assembly includes an unlock rod 9, blind rivet nuts 10, and an unlock rod rubber cover 13. The two blind rivet nuts 10 are left-right symmetrically arranged on two ends of the unlock rod 9. The unlock rod rubber cover 13 is disposed on a middle portion of the unlock rod 9. The lock assembly includes lock seats 14, a lock slide block 15, a locking member 16, a lock seat top cover 17, a lock seat rear cover 18, a slide block spring 19 and a locking member spring 20. The two lock seats 14 are left-right symmetrically arranged on two ends of the unlock rod 9. The two ends of the unlock rod 9 are inserted from lower openings of the lock seats 14, the locking member spring 20 and the locking member 16 are sequentially placed in from an upper end of the lock seat 14 on one side, the locking member 16 and the unlock rod 9 are connected together, the lock seat top cover 17 is installed to a top portion of the lock seats 14, and the lock slide block 15, the lock slide block spring 19 and the rear lock seat cover 18 are then sequentially placed in from the rear of the lock seats 14 and then fixed together.

Specifically, referring to FIG. 3 and FIG. 4, the lock seats 14 in the lock device assembly are disposed on the top portion of the rear wheel frame 1 of the rear wheel frame assembly. The front handlebar struts 5 of the front handlebar strut assembly have the lower ends thereof rotatably connected to the handlebar strut connecting members 11 of the rear wheel frame assembly, and the upper ends thereof rotatably connected to the front ends of the handlebar 8 of the handlebar assembly. The two rear handlebar strut assemblies are left-right symmetrically arranged on two sides of the rear wheel frame assembly. The rear handlebar struts 7 have one ends thereof rotatably connected to the middle portion of the rear wheel frame 1, and the other ends rotatably connected to the rear end of the handlebar 8 of the handle assembly. The lock hook 21 is additionally installed between the right rear handlebar strut 7 and the handlebar 8. The mesh bag 26 has the four corners thereof fixed to the inner side of the handlebar assembly through the assembly holes. Thus, in addition to an appealing appearance, small objects that need to be carried around during daily travel can be placed easily and taken out with ease. The two rear wheels 23 are left-right symmetrically arranged in the rear axle supports 4 of the rear wheel frame assembly. The lock columns 22 are disposed on right lower ends of the rear wheel frame 1 to form a push-back handlebar device assembly when assembled. The rearmost pull plates 28 and the cross-bars 27 on the two sides of the collapsible utility wagon body assembly are respectively rotatably connected to the middle portion and the lower ends on the two sides of the rear wheel frame 1 of the push-back handlebar device assembly, hence forming a collapsible utility wagon.

A process for unfolding the present invention is as follows. The lock hook 21 is lifted to separate from the lock column 22, the handlebar rubber glove 12 is held by a hand and lifted, under a linking effect, the front handlebar struts 5 and the rear handlebar struts 7 are unfolded outward and rotated upward, and the handlebar locking rod 6 is slid into the lock seats 14 to push the slide block 15 into the lock seat. At this point, the lock slide block spring 19 is contracted due to a pressure received, the lock slide block 15 is disengaged from a contact with the locking member 16, the locking member spring 20 is released from the pressure and extends upward, and the locking member 16 bounces out, as shown in FIG. 10. The handlebar locking rod 6 is fixed in the lock seats 14 to complete unfolding of the push-back handle, as shown in FIG. 1.

Figure 11:
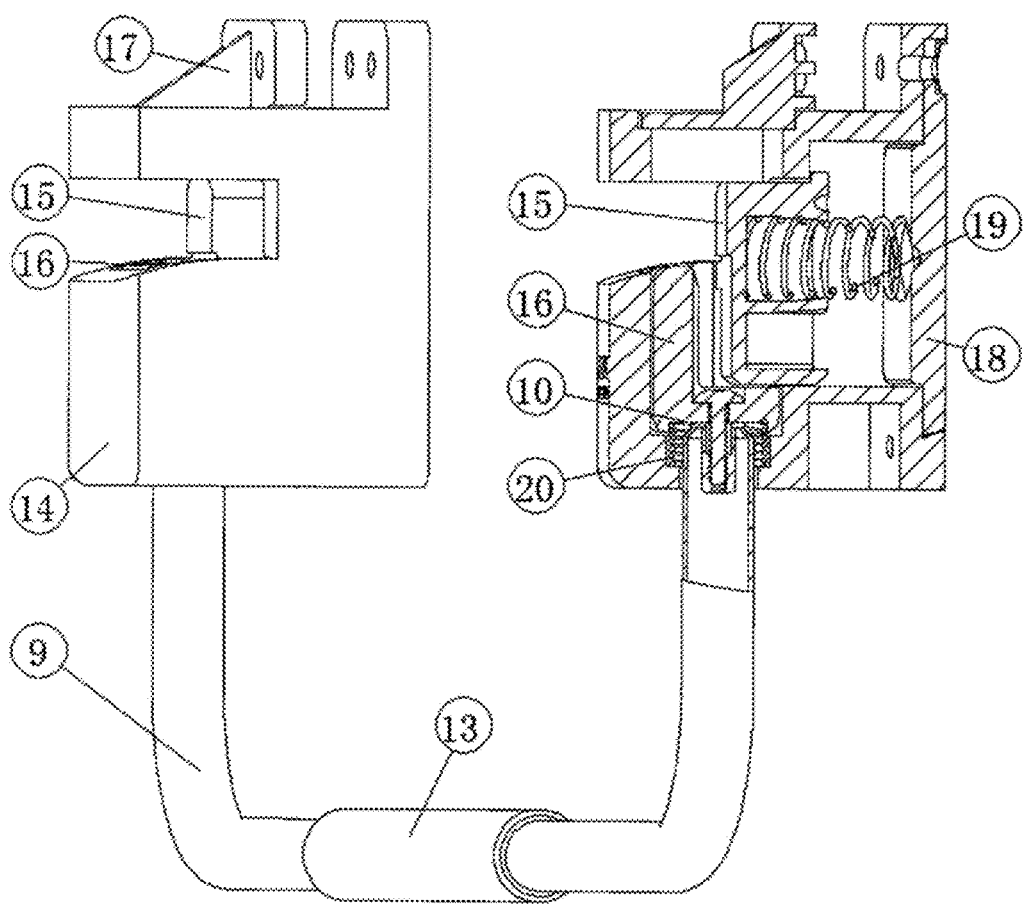
FIG. 11 is a schematic diagram of an unlocked state of a lock device assembly.
Figure 12:
FIG. 12 is a schematic perspective view illustrating folding of the basket extension.
Figure 13:
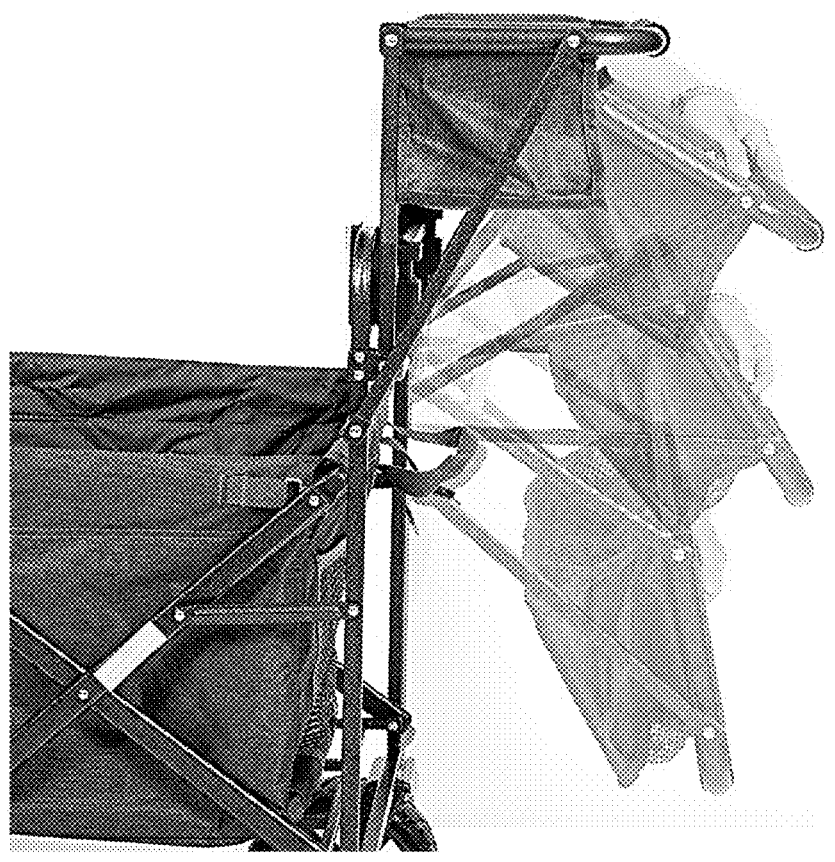
FIG. 13 is a schematic side view illustrating folding of the basket extension.

A process for collapsing the present invention is as follows. The unlock rod rubber glove 13 is held by a hand and pulled downward to drive the locking member 16 to slide downward. At this point, the locking member spring 20 is compressed by a pressure, the locking member 16 is disengaged from the contact with the lock slide block 15, the lock slide block spring 19 is released from the pressure and extends forward, and the lock slide block 15 bounces out to lock the locking member 16, as shown in FIG. 11. At this point, the handlebar locking rod 6 disengages from the lock seats 14, the front handlebar struts 5 and the rear handlebar struts 7 are unfolded outward and rotated downward, the handlebar 8 moves downward under a linking effect to eventually become parallel to the rear wheel frame 1, and the lock hook 21 is hooked on the lock column 22 to complete collapsing of the push-back handlebar, as shown in FIG. 2.

The collapsible utility wagon with a push-back function device of the prevent invention can be operated single-handedly and be collapsed with a simple process and a minimal effort. Moreover, the collapsible wagon of the present invention occupies a small space when collapsed and thus can be readily placed in a back trunk of a vehicle when located outdoors or be easily erected within a small space when located indoors, and has a light weight and a good stability.

It should be noted that the description above is merely for illustrating rather than limiting the technical solution of the present invention. Other modifications or equivalent replacements and substitutions made by a person skilled in the art without departing from the spirit and scope of the technical solution of the present invention are to be encompassed within the scope of protection of the appended claims of the present invention.

What is claimed is:

1. A collapsible utility wagon with a push-back function device, comprising:
   a push-back function device assembly, and
   a collapsible utility wagon body assembly,
   wherein the push-back function device assembly is provided behind the collapsible utility wagon body assembly,
   wherein the push-back function device assembly comprises a rear wheel frame assembly, a front handlebar strut assembly, two rear handlebar strut assemblies, a lock device assembly, a handlebar assembly, a lock hook, a lock column, a mesh bag and rear wheels; the lock device assembly is disposed on a top portion of the rear wheel frame assembly; the front handlebar strut assembly has a lower end rotatably connected to the rear wheel frame assembly, and an upper end rotatably connected to a front end of the handlebar assembly; the two rear handlebar strut assemblies are left-right symmetrically arranged on two sides of the rear wheel frame assembly, and each of the rear handlebar strut assemblies has one end rotatably connected to a middle portion of the rear wheel frame assembly and the other end rotatably connected to a rear end of the handlebar assembly; the lock hook is disposed at a connection point of the right rear handlebar strut assembly and the handlebar assembly; the mesh bag has four corners fixed on an inner side of the handlebar assembly; the rear wheels are left-right symmetrically arranged on a bottom portion of the rear wheel frame assembly; and the lock column is disposed on a right lower end of the rear wheel frame assembly, and wherein the lock device assembly comprises an unlock rod assembly and two lock assemblies symmetrically arranged on two ends of the unlock rod assembly; the unlock rod assembly comprises an unlock rod, blind rivet nuts, and an unlock rod rubber cover; the blind rivet nuts are left-right symmetrically arranged on two ends of the unlock rod, and the unlock rod rubber cover is disposed on a middle portion of the unlock rod; the lock assembly comprises a lock seat, a locking member, a lock slide block, a lock seat top cover, a lock seat rear cover, a locking member spring and a slide block spring.

2. The collapsible utility wagon with a push-back function device according to claim 1, wherein the collapsible utility wagon body assembly comprises a fabric wagon body; the fabric wagon body has a front side provided with front wheels, and has left and right sides symmetrically arranged with cross-bar assemblies; each of the cross-bar assemblies is formed by connecting a plurality of cross-bars; the rear-most upper cross-bar is provided with a pull plate; and the collapsible utility wagon body assembly is rotatably connected to a middle portion and a lower end of the two sides of the rear wheel frame assembly through the rearmost lower cross-bar and the pull plate.

3. The collapsible utility wagon with a push-back function device according to claim 1, wherein the rear wheel frame assembly comprises a rear wheel frame, a rear wheel frame support, lock seat securing rods, rear axle supports, and handlebar strut connecting members; the rear wheel frame support is disposed at a bottom portion of the rear wheel frame; the rear axle supports are left-right symmetrically arranged at a bottom of the rear wheel support; the two lock seat securing rods are left-right symmetrically arranged on an upper inner side of the rear wheel frame; and the handlebar strut connecting members are left-right symmetrically arranged on a top portion of the rear wheel frame.

4. The collapsible utility wagon with a push-back function device according to claim 1, wherein the front handlebar strut assembly comprises front handlebar struts and a handlebar locking rod; the front handlebar struts are left-right symmetrically arranged on two ends of the handlebar locking rod, and have both upper and lower ends provided with sleeves.

5. The collapsible utility wagon with a push-back function device according to claim 1, wherein the rear handlebar strut assembly comprises rear handlebar struts and sleeves; and the rear handlebar struts have both upper and lower ends provided with sleeves.

6. The collapsible utility wagon with a push-back function device according to claim 1, wherein the handlebar assembly comprises a handlebar, a handlebar rubber cover and top covers; the handlebar cover sleeves a middle portion of the handlebar, and the handlebar has both ends provided with the top covers.

7. The collapsible utility wagon with a push-back function device according to claim 1, wherein the mesh bag has four corners thereof provided with assembly holes, and the four corners of the mesh bag are fixed to an inner side of the handlebar assembly through the assembly holes.

8. The collapsible utility wagon with a push-back function device according to claim 1, wherein the front handlebar strut assembly has a lower end rotatably connected to the rear wheel frame assembly, and an upper end rotatably connected to a front end of the handlebar assembly;

the two rear handlebar strut assemblies are left-right symmetrically arranged on two sides of the rear wheel frame assembly, and each of the rear handlebar strut assemblies has one end rotatably connected to a middle portion of the rear wheel frame assembly and the other end rotatably connected to a rear end of the handlebar assembly; the lock hook is disposed at a connection point of the right rear handlebar strut assembly and the handlebar assembly; the mesh bag has four corners fixed on an inner side of the handlebar assembly; the rear wheels are left-right symmetrically arranged on a bottom portion of the rear wheel frame assembly; and the lock column is disposed on a right lower end of the rear wheel frame assembly.

9. The collapsible utility wagon with a push-back function device according to claim 1, wherein the handlebar assembly comprises a handlebar, a handlebar rubber cover and top covers;

the handlebar cover sleeves a middle portion of the handlebar, and the handlebar has both ends provided with the top covers.

10. The collapsible utility wagon with a push-back function device according to claim 1, wherein the mesh bag has four corners thereof provided with assembly holes, and the four corners of the mesh bag are fixed to an inner side of the handlebar assembly through the assembly holes.

11. A collapsible utility wagon with a push-back function device, comprising:

a push-back function device assembly, and a collapsible utility wagon body assembly, wherein the push-back function device assembly is provided behind the collapsible utility wagon body assembly, wherein the push-back function device assembly comprises a rear wheel frame assembly, a front handlebar strut assembly, two rear handlebar strut assemblies, a lock device assembly, a handlebar assembly, a lock hook, a lock column, a mesh bag and rear wheels, wherein the lock device assembly is disposed on a top portion of the rear wheel frame assembly, and wherein the lock device assembly comprises an unlock rod assembly and two lock assemblies symmetrically arranged on two ends of the unlock rod assembly; the unlock rod assembly comprises an unlock rod, blind rivet nuts, and an unlock rod rubber cover; the blind rivet nuts are left-right symmetrically arranged on two ends of the unlock rod, and the unlock rod rubber cover is disposed on a middle portion of the unlock rod; the lock assembly comprises a lock seat, a locking member, a lock slide block, a lock seat top cover, a lock seat rear cover, a locking member spring and a slide block spring.

12. The collapsible utility wagon with a push-back function device according to claim 11, wherein the collapsible utility wagon body assembly comprises a fabric wagon body; the fabric wagon body has a front side provided with front wheels, and has left and right sides symmetrically arranged with cross-bar assemblies; each of the cross-bar assemblies is formed by connecting a plurality of cross-bars; the rearmost upper cross-bar is provided with a pull plate; and the collapsible utility wagon body assembly is rotatably connected to a middle portion and a lower end of the two sides of the rear wheel frame assembly through the rearmost lower cross-bar and the pull plate.

13. The collapsible utility wagon with a push-back function device according to claim 11, wherein the rear wheel frame assembly comprises a rear wheel frame, a rear wheel frame support, lock seat securing rods, rear axle supports, and handlebar strut connecting members; the rear wheel frame support is disposed at a bottom portion of the rear wheel frame; the rear axle supports are left-right symmetrically arranged at a bottom of the rear wheel support; the two lock seat securing rods are left-right symmetrically arranged on an upper inner side of the rear wheel frame; and the handlebar strut connecting members are left-right symmetrically arranged on a top portion of the rear wheel frame.

14. The collapsible utility wagon with a push-back function device according to claim 11, wherein the front handlebar strut assembly comprises front handlebar struts and a handlebar locking rod; the front handlebar struts are left-right symmetrically arranged on two ends of the handlebar locking rod, and have both upper and lower ends provided with sleeves.

15. The collapsible utility wagon with a push-back function device according to claim 11, wherein the rear handlebar strut assembly comprises rear handlebar struts and sleeves; and the rear handlebar struts have both upper and lower ends provided with sleeves.

\* \* \* \* \*